US006976930B2

(12) United States Patent
Winzeler

(10) Patent No.: US 6,976,930 B2
(45) Date of Patent: Dec. 20, 2005

(54) TRANSMISSION ASSEMBLY

(75) Inventor: James Elmer Winzeler, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 62 days.

(21) Appl. No.: 10/740,451

(22) Filed: Dec. 22, 2003

(65) Prior Publication Data

US 2005/0137050 A1    Jun. 23, 2005

(51) Int. Cl.$^7$ ................................................ F16H 3/62
(52) U.S. Cl. ...................................... 475/277; 475/278
(58) Field of Search ............................... 475/277, 278, 475/282, 284, 288

(56) References Cited

U.S. PATENT DOCUMENTS

| | | | |
|---|---|---|---|
| 3,347,113 A | 10/1967 | Ramsel ........................ 475/55 |
| 3,863,524 A * | 2/1975 | Mori et al. ................. 475/278 |
| 4,004,473 A | 1/1977 | Pearce et al. ................. 475/66 |
| 4,089,238 A * | 5/1978 | Forster et al. .............. 475/278 |
| 4,090,415 A | 5/1978 | Gorrell et al. ............. 180/69.6 |
| 4,205,563 A | 6/1980 | Gorrell ........................ 475/59 |
| 4,420,992 A | 12/1983 | Windish ..................... 475/118 |
| 4,446,758 A | 5/1984 | Winzeler et al. ............ 475/116 |
| 4,531,428 A | 7/1985 | Windish ..................... 475/279 |
| 4,658,673 A | 4/1987 | Nerstad et al. ............. 475/290 |
| 4,660,439 A * | 4/1987 | Hiraiwa ...................... 475/278 |
| 4,976,670 A * | 12/1990 | Klemen ...................... 475/278 |
| 5,098,357 A * | 3/1992 | Asada et al. ................ 475/278 |
| 5,924,951 A | 7/1999 | Winzeler et al. ............ 475/275 |
| 6,626,790 B2 * | 9/2003 | Raghavan et al. .......... 475/282 |
| 2003/0130084 A1 | 7/2003 | Kao et al. |
| 2003/0195079 A1 | 10/2003 | Raghavan et al. |

* cited by examiner

*Primary Examiner*—Sherry Estremsky
(74) *Attorney, Agent, or Firm*—Finnegan, Henderson, Farabow, Garrett & Dunner LLP

(57) ABSTRACT

A transmission assembly includes a stationary housing and a first section having a coupling member. The first section further includes a first planetary gear assembly, a second planetary gear assembly, and a third planetary gear assembly operatively disposed in the stationary housing. Each of the planetary gear assemblies includes a ring gear, at least one planet carrier having at least one planet gear, and a sun gear. The sun gears of at least the first and second planetary gear assemblies are operatively connected to the coupling member. The first section also includes an input member operatively connected to the third planetary gear assembly to drive the first section. A first stationary clutch operatively connects the coupling member to the stationary housing. A second stationary clutch operatively connects at least one of the planet carrier and the ring gear of the first planetary gear assembly to the stationary housing.

17 Claims, 6 Drawing Sheets

| GEAR | ENGAGED CLUTCHES | | | | | | | TOTAL REDUCTION | STEP |
|---|---|---|---|---|---|---|---|---|---|
| | 38 | 40 | 42 | 70 | 72 | 74 | 76 | | |
| 1 | | | E | | | E | | 8.4084 | 1.2580 |
| 2 | | E | | | | E | | 6.7118 | 1.2522 |
| 3 | E | | | | | E | | 5.3598 | 1.2568 |
| 4 | | | E | | E | | | 4.2645 | 1.2528 |
| 5 | | E | | | E | | | 3.404 | 1.2522 |
| 6 | E | | | | E | | | 2.7184 | 1.2514 |
| 7 | | | E | E | | | | 2.1722 | 1.2528 |
| 8 | | E | | E | | | | 1.7339 | 1.2522 |
| 9 | E | | | E | | | | 1.3846 | 0.0000 |
| N | | | | | | | | 0.0000 | 0.0000 |
| R | | | | | | | E | −7.9958 | |

E = ENGAGED

*FIG. 3*

| GEAR | ENGAGED CLUTCHES | | | | | | | TOTAL REDUCTION | STEP |
|---|---|---|---|---|---|---|---|---|---|
| | 104 | 106 | 108 | 70 | 72 | 74 | 76 | | |
| 1 | | E | | | | E | | 5.9129 | 1.2498 |
| 2 | E | | | | | E | | 4.731 | 1.2490 |
| 3 | | | E | | | E | | 3.7879 | 1.2478 |
| 4 | E | | | | E | | | 3.0355 | 1.2498 |
| 5 | | | | | E | | | 2.4288 | 1.2490 |
| 6 | | E | E | | | | | 1.9446 | 1.2458 |
| 7 | | | | E | | | | 1.561 | 1.2498 |
| 8 | E | | E | E | | | | 1.249 | 1.2490 |
| 9 | | | E | E | | | | 1.0000 | 0.0000 |
| N | | | | | | | | 0.0000 | 0.0000 |
| R | | | E | | | | E | -4.9647 | |

E = ENGAGED

TRANSMISSION ASSEMBLY

TECHNICAL FIELD

The present application is directed to a transmission assembly and, more particularly, to a multi-speed planetary-type transmission assembly.

BACKGROUND

Work machines such as, for example, off-highway trucks and other heavy construction and mining machines, are used to perform many tasks. To effectively perform these tasks, the work machines require a power source that provides significant power to a transmission. The power source may be an engine such as, for example, a turbine engine, diesel engine, gasoline engine, or natural gas engine operated to generate a power output. The transmission must provide a range of gearing in order to allow the work machine to work at several different speeds while keeping the engine within a desired operating range. Typically, the work machines include a multi-speed transmission that generally includes a series of gears and is connected to the engine via a torque converter. The utilization of a torque converter helps to overcome problems of initial star-up and further provides a broader torque transmission range.

As described in U.S. Pat. No. 5,924,951 to Winzeler et al., a multi-speed transmission for a work machine typically includes a variety of gears and clutches that are disposed between an input member and an output member of a work machine. The input member is connected to, and is rotated by, an engine via a torque converter. The output member is used to move the work machine. The clutches are used to engage different combinations of gears that will connect the input member to the output member through a selected gear ratio. The selected gear ratio translates the rotational speed of the input member, as provided by the engine, to a desired rotational speed of the output member.

To generate the wide range of gear ratios required by the work machine, the multi-speed transmission typically includes a plurality of intermeshing gears and a corresponding plurality of clutches. Each of the gears may have different numbers of teeth to achieve the required gear ratios. In addition, differently designed clutches may be required to engage the different gears into the necessary gear ratios.

The manner in which the gears are engaged to provide the different gear ratios and the number of different gear ratios impacts the efficiency of the transmission and work machine. The larger the step and the more variable the step between gear ratios, the more an engine will deviate from the desired operating range. Energy and efficiency are lost when the work machine operates outside of the desired operating range.

The vehicle transmission of the present disclosure solves one or more of the problems set forth above.

SUMMARY OF THE INVENTION

One aspect of the present disclosure is directed to a transmission assembly that includes a stationary housing and a first section having a coupling member. The first section further includes a first planetary gear assembly, a second planetary gear assembly, and a third planetary gear assembly operatively disposed in the stationary housing. Each of the planetary gear assemblies includes a ring gear, at least one planet carrier having at least one planet gear, and a sun gear. The at least one planet gear of each planetary gear assembly is adapted to mesh with at least one of the sun gear and the ring gear of the corresponding planetary gear assembly. The sun gears of at least the first and second planetary gear assemblies are operatively connected to the coupling member. The first section also includes an input member operatively connected to the third planetary gear assembly. A first stationary clutch is adapted to selectively and operatively connect the coupling member to the stationary housing. A second stationary clutch is adapted to selectively and operatively connect at least one of the at least one planet carrier and the ring gear of the first planetary gear assembly to the stationary housing. An intermediate coupling member is operatively connected to the third planetary gear assembly and adapted to be driven by the first section.

BRIEF DESCRIPTION OF THE DRAWINGS

FIG. 3 is a chart identifying the engaged clutches, ratio reduction, and step percents for each gear provided by the transmission of FIG. 2;

FIG. 5 is a chart identifying the engaged clutches, ratio reduction, and step percents for each gear provided by the transmission of FIG. 4.

DETAILED DESCRIPTION

Figure 1:
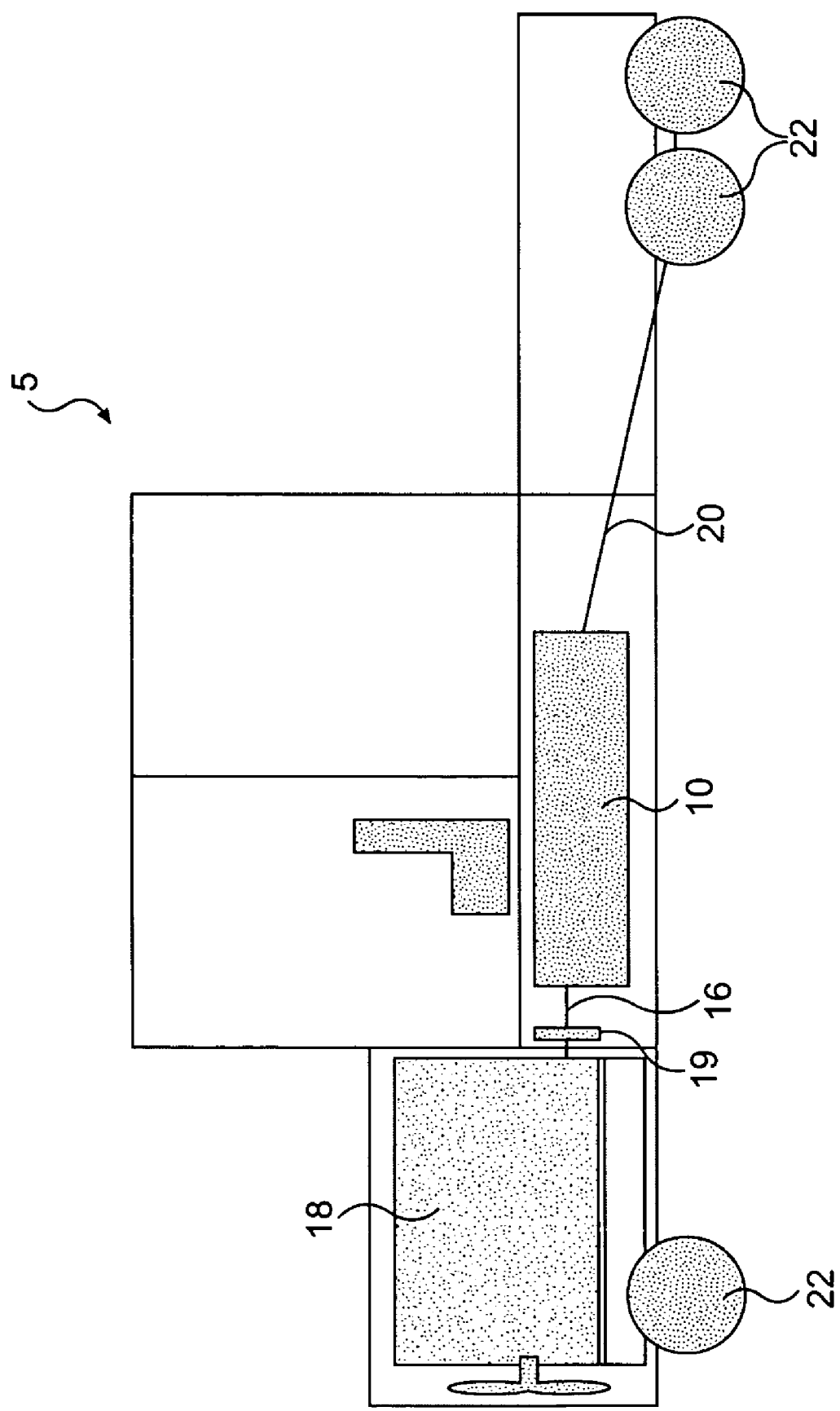
FIG. 1 is an diagrammatic illustration of a work machine in accordance with one embodiment of the present disclosure.

Referring to FIG. 1, a work machine 5 includes a transmission assembly 10, an input member 16 connecting the transmission assembly 10 to a power source 18 via a torque converter 19, and an output member 20 connecting the transmission assembly 10 to one or more traction devices 22. The power source may be an engine such as a diesel engine, a gasoline engine, or a natural gas engine operated to generate a power output.

Figure 2:
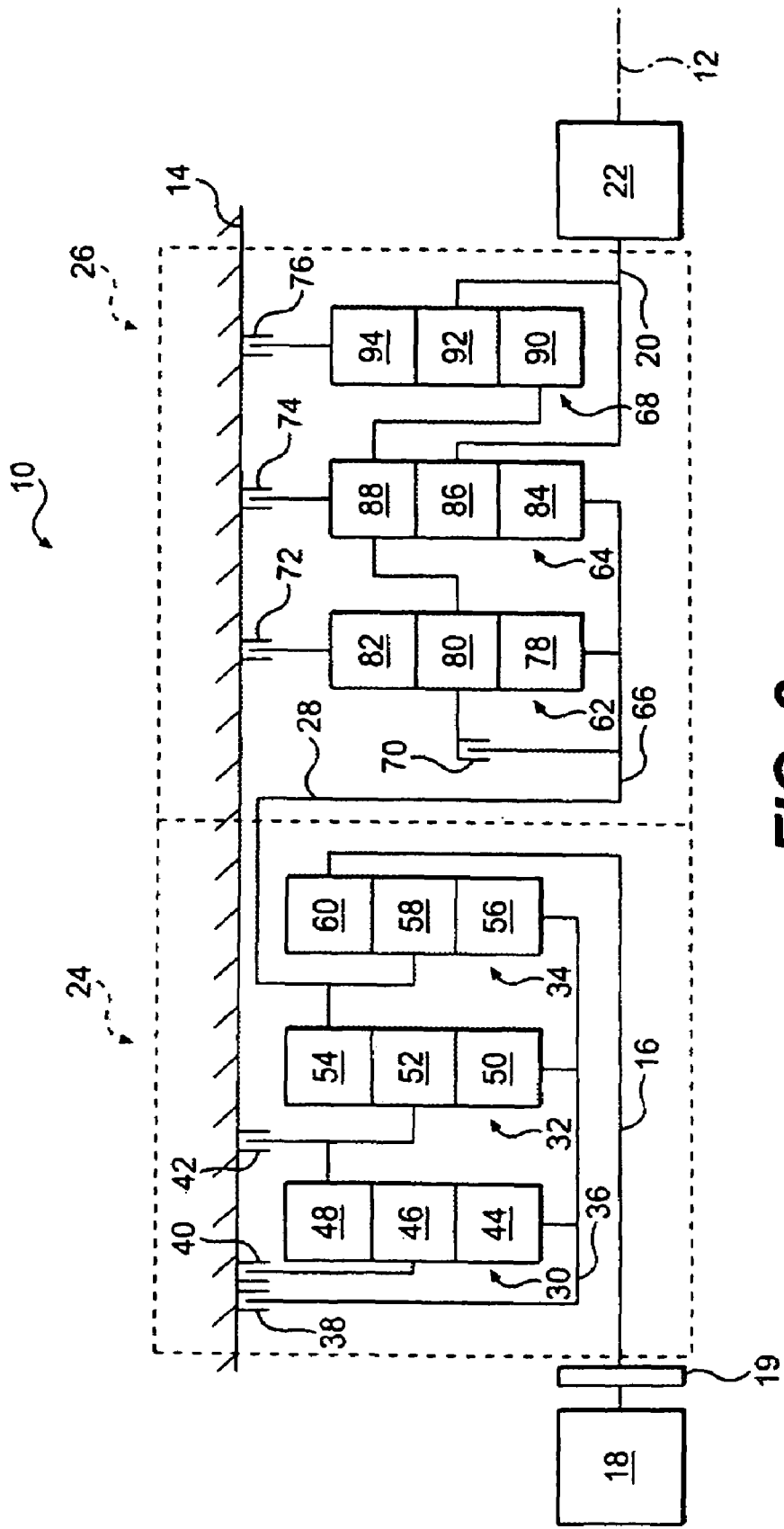
FIG. 2 is a schematic illustration of a transmission assembly in accordance with one embodiment of the present disclosure.

FIG. 2 schematically illustrates the transmission assembly 10 on one side of a rotational axis 12. The transmission assembly 10 may include a stationary housing 14. The transmission assembly 10 may be divided into a first section 24 and a second section 26 and may include a coupling member 28 connecting the first section 24 to the second section 26. The input member 16 and the output member 20 may be aligned along the rotational axis 12.

The first and second sections 24, 26, may both include three planetary gear assemblies rotatably supported and aligned along the rotational axis 12 and disposed within the stationary housing 14. The first section 24 and second section 26 may also include a plurality of clutches configured to selectively engage the stationary housing 14 and the planetary gear assemblies to produce predetermined drive ratios. The structure of the gears, clutches, input members, output members, coupling members, and the connections therebetween can be achieved using conventional components.

As will be explained in more detail in connection with the embodiments of this disclosure, a planetary gear assembly may include at least one sun gear, at least one planet carrier including a plurality of planet gears, and a ring gear. The planet gears of the planet carrier mesh with the sun gear and the ring gear, and with intermediate planet gears of the same planet carrier if intermediate planet gears are included in the planetary gear assembly. The sun gear, planetary carrier, planet gears, and ring gear may all rotate together simultaneously. Alternately, each of the sun gear, planet carrier, and ring gear may be held stationary. The planetary gear assembly receives an input rotation at a first speed and generates a corresponding output rotation at a second speed. The change in rotational speed between the input and the output depends upon the number of teeth in the sun gear, the plurality of planet gears (if multiple planet gear sets) mounted to the planet carrier, and the ring gear. The change in rotational speed also depends upon the gear that is used to receive the input rotation, the gear that is selected to provide the output rotation, and which gear, if any, is held stationary.

The transmission assembly 10 illustrated in FIG. 1 may include the first section 24 having a first planetary gear assembly 30, a second planetary gear assembly 32, and a third planetary gear assembly 34 supported on a coupling member 36. The transmission assembly may also include a first stationary clutch 38, a second stationary clutch 40, and a third stationary clutch 42, having components thereof connected to stationary housing 14.

The first planetary gear assembly 30 may include a sun gear 44, a planet carrier 46, and a ring gear 48. The second planetary gear assembly 32 may include a sun gear 50, a planet carrier 52, and a ring gear 54. The third planetary gear assembly 34 may include a sun gear 56, a planet carrier 58, and a ring gear 60.

Clutches within the first section 24 of transmission assembly 10 may connect the coupling member 36, the sun gears 44, 50, 56, the planet carriers 46, 52 and/or the ring gear 48 to each other and/or the housing 14 in a variety of ways to modify the rotation of coupling member 28. These connections create an underdrive mode of operation. The coupling member 36 may be selectively connected to the housing 14 via the first stationary clutch 38, and connected to the sun gears 44, 50, and 56. The planet carrier 46 may be selectively connected to the housing 14 through the second stationary clutch 40. The ring gear 48 and planet carrier 52 may be connected to each other and may be selectively connected to the housing 14 through the third stationary clutch 42. The ring gear 54 may be connected to the planet carrier 58 and to the coupling member 28. The ring gear 60 may be connected to the input member 16 that extends through coupling member 36.

The second section 26 of transmission assembly 10 may include a first planetary gear assembly 62 and a second planetary gear assembly 64 supported on an intermediate coupling member 66, and a third planetary gear assembly 68. The second section 26 may also include a rotating clutch 70, a first stationary clutch 72, a second stationary clutch 74, and a third stationary clutch 76. The stationary clutches 72, 74, and 76 may be connected to stationary housing 14.

The first planetary gear assembly 62 may include a sun gear 78, a planet carrier 80, and a ring gear 82. The second planetary gear assembly 64 may include a sun gear 84, a planet carrier 86, and a ring gear 88. The third planetary gear assembly 68 may include a sun gear 90, a planet carrier 92, and a ring gear 94.

The numerous clutches within the second section 26 may connect intermediate coupling member 66, sun gears 78, 84, 90, planet carrier 80 and/or ring gears 82, 88, 94 to each other and/or to the housing 14 in a variety of ways to modify the rotation of output member 20. These connections create an additional speed reduction to that achieved by the first section 24 of the transmission assembly 10. The intermediate coupling member 66 may be connected to coupling member 28 and may be selectively connected to the planet carrier 80 via the rotating clutch 70. Intermediate coupling member 66 may also be connected to the sun gear 78 and the sun gear 84. The ring gear 82 may be selectively coupled to the housing 14 through the first stationary clutch 72. The planet carrier 80 may be connected to the ring gear 88. The ring gear 88 may be selectively coupled to the housing 14 via the second stationary clutch 74, and connected to the sun gear 90. The planet carrier 86 may be connected to the output member 20. The ring gear 94 may be selectively coupled to the housing 14 through the third stationary clutch 76. The planet carrier 92 may be connected to the output member 20.

FIG. 3, discloses a truth table 95 describing the engagement combinations of the clutches 38, 40, 42, 70, 72, and 74, which establishes 9 forward speed ratios and a reverse speed between the input member 16 and output member 20 by way of the planetary gear assemblies 30, 32, 34, 62, 64, and 68.

Figure 4:
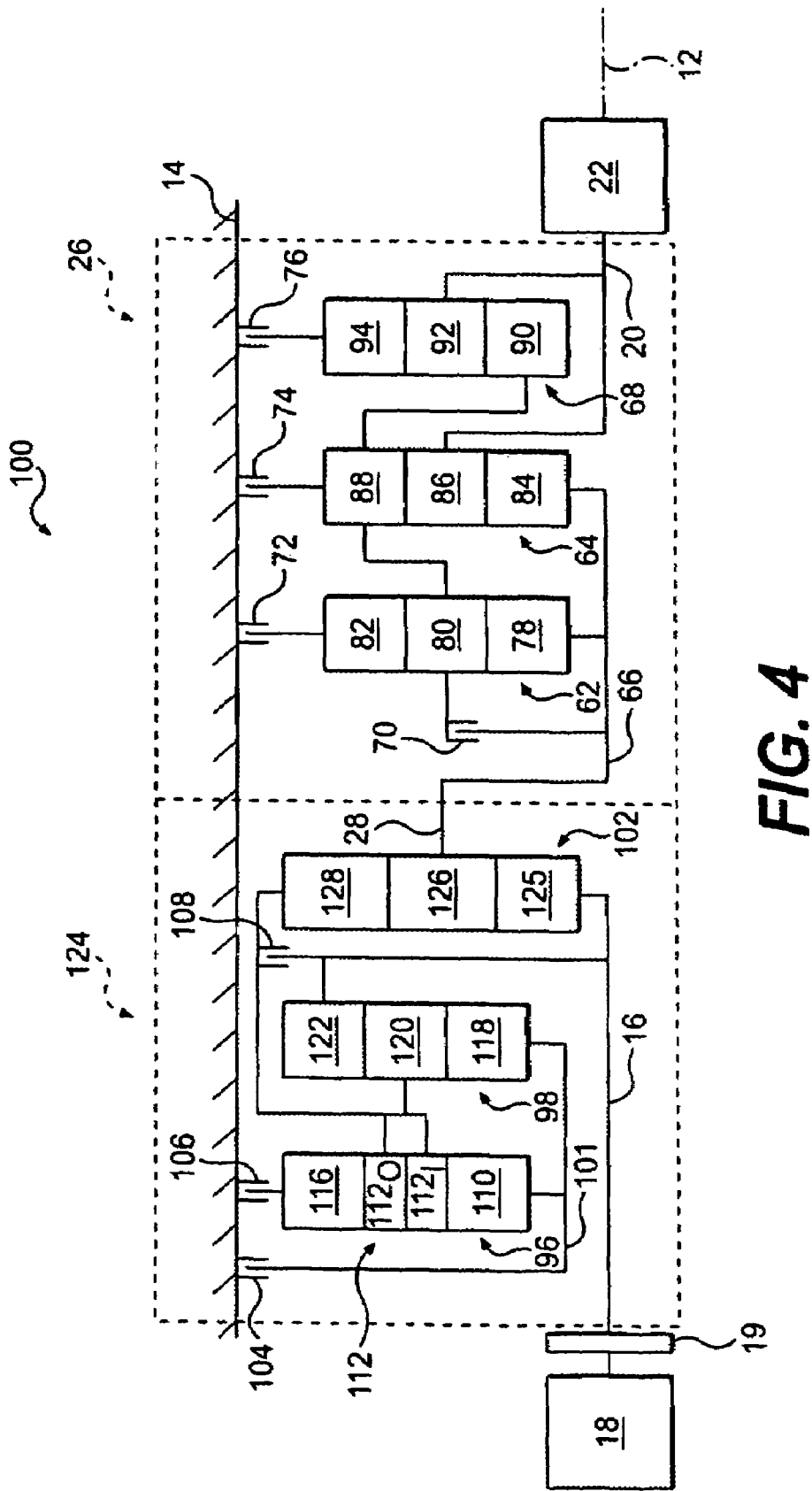
FIG. 4 is a schematic of a transmission assembly in accordance with a second embodiment of the present disclosure.

Another embodiment of a transmission assembly 100, illustrated in FIG. 4, may include a first section 124 having a first planetary gear assembly 96 and a second planetary gear assembly 98 supported on a coupling member 101, and a third planetary gear assembly 102. The transmission assembly 100 may also include a first stationary clutch 104, a second stationary clutch 106, and a rotating clutch 108.

The first planetary gear assembly 96 may include a sun gear 110, a planet carrier 112 having an inner planet gear set $112_I$ that meshes with sun gear 110 and an outer planet gear set $112_O$ that meshes with inner planet gear set $112_I$, and a ring gear 116 that meshes with outer planet gear set $112_O$. The second planetary gear assembly 98 may include a sun gear 118, a planet carrier 120, and a ring gear 122. The third planetary gear assembly 102 may include a sun gear 125, a planet carrier 126, and a ring gear 128.

Again, coupling member 101, sun gears 110, 118, 125, planet carriers 112, 120, and ring gears 116, 122, 128 may be connected to each other and/or the housing 14 in a variety of ways to modify rotation of coupling member 28 to create an underdrive mode of operation. The coupling member 101 may be selectively connected to the housing 14 via the first stationary clutch 104, and connected to the sun gears 110 and 118. The planet carrier 112 may be selectively connected to the ring gear 122 and the input member 16 via the rotating clutch 108, and connected to the planet carrier 120 and the ring gear 128. The ring gear 116 may be selectively connected to the housing 14 through the second stationary clutch 106. The planet carrier 126 may be connected to the coupling member 28. Additionally, the sun gear 125 may be connected to input member 16.

The second section 26 of the transmission assembly 100 includes the same configuration described previously in connection with the transmission assembly 10 (referring to FIG. 2), and like reference numbers are used to refer to like parts. FIG. 5 is a truth table 129 describing the engagement combinations of the clutches 104, 106, 108, 70, 72, 74, and 76, which establishes 9 forward speed ratios and a reverse speed between the input member 16 and the output member 20 by way of the planetary gear assemblies 96, 98, 102, 62, 64, and 68.

Figure 6:
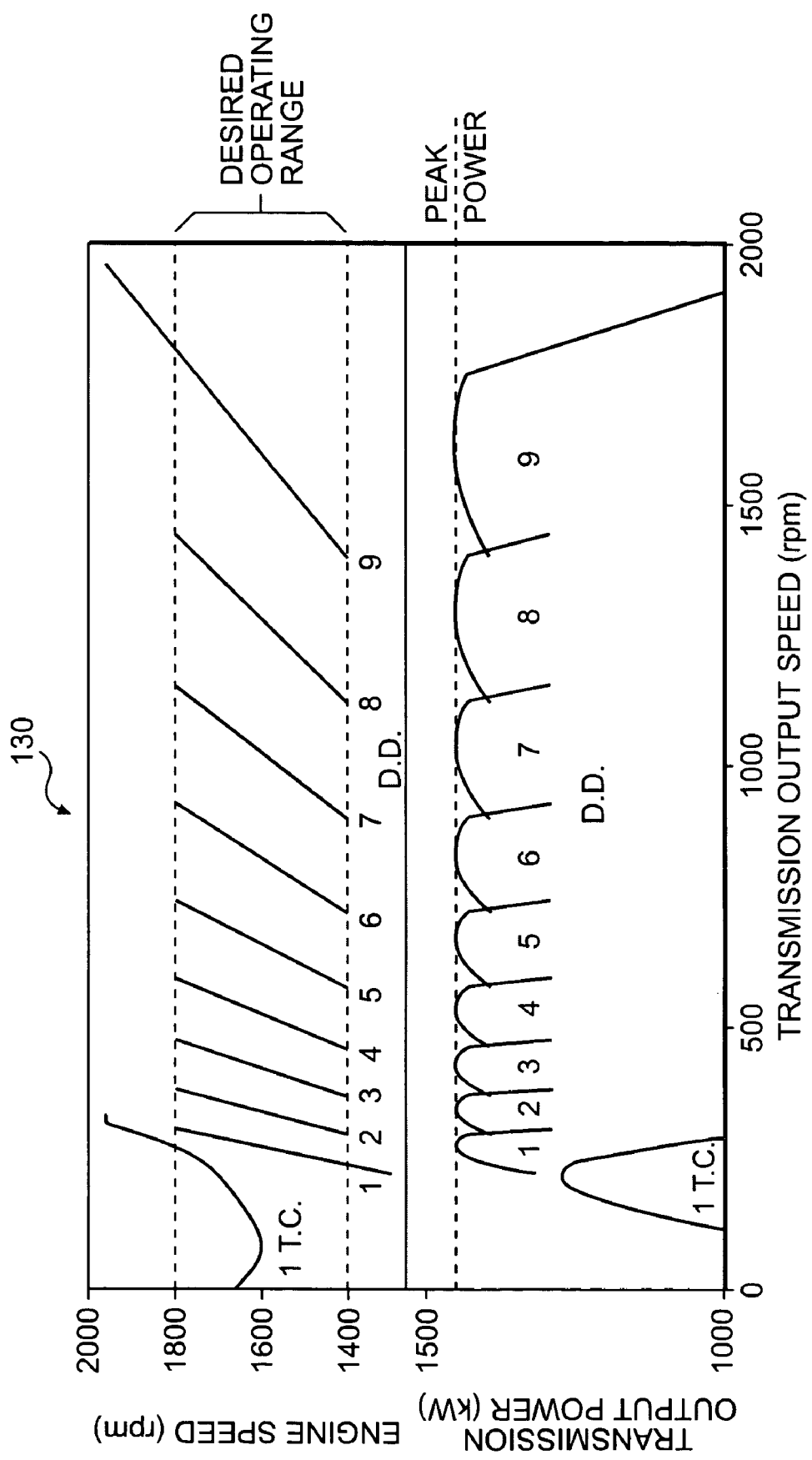
FIG. 6 is a graph illustrating the performance of a transmission assembly in accordance with an embodiment of the present disclosure.

The sequential operation of the transmission assembly 10 is illustrated in the graph 130 of FIG. 6. Transmission output power and engine speed are plotted along the Y-axis against transmission output speed along the X-axis for each of the nine forward gears. The reference letters "T.C." and "D.D." indicate whether the work machine is operating in torque converter or direct drive.

INDUSTRIAL APPLICABILITY

While the transmission of the present disclosure has potential application in any work machine having a multi-speed transmission, the disclosed transmission has particular applicability in off-highway trucks and other heavy construction and mining work machines. Such work machines have specific gearing requirements that the disclosed transmission is capable of meeting, while allowing an engine of the work machine to remain within a desired operating range.

For the purposes of the present disclosure, the term "desired operating range" includes those speeds and torques at which the engine experiences substantially stable and efficient operation. When operating outside the desired operating range, the engine may experience unstable operation such as, for example, overspeed situations, underspeed situations, lugging, and/or stalling. Efficiency losses may also be experienced by the engine when operating outside the desired operating range such as, for example, increased fuel consumption, increased exhaust emissions, increased engine temperatures, and/or decreased responsiveness.

The present disclosure provides a transmission assembly that utilizes a plurality of planetary gear assemblies and clutch arrangements that provide relatively uniform and closely spaced speed intervals that enhance performance and shift quality.

FIG. 6 illustrates the specific advantages of having nine forward gears with constant or nearly constant step ratios between shifts (referring to FIGS. 3 and 5), which become apparent when compared with earlier transmissions of fewer gears or of varying step ratios. As shown in FIG. 6, when the torque converter is in direct drive mode (i.e., when a torque converter lock-up clutch is engaged) the evenly-spaced step ratios between the transmission speed reductions produce nearly constant utilization approaching the peak input power, with only minor deviations from the peak input power. Deviations from peak power utilization may result in work machine inefficiency. Producing nearly constant utilization of peak input power ensures that the most efficient part of each drive ratio is fully utilized. It can also be seen in FIG. 6 that the output speed of the engine (input speed of the transmission) is kept within a substantially narrow desired operating range, thereby resulting in efficient operation of the work machine.

In contrast, conventional transmissions may include uneven and/or extreme peaks and valleys of power utilization and wide ranges of input speed as compared with the disclosed transmission. Use of the torque converter drive, wherein power transmitting efficiency is less, but variable torque capability is much greater, is required only at extremely low output speeds.

Reference will now be made to the operation of the transmission assembly 10 and 100 as set forth in the truth tables 95 and 129 of FIGS. 3 and 5, respectively. During operation of the work machine, it is desirable to select a number of gear ratios to match the power output of the engine to a given load condition. Selection of the gear ratios may be made manually or automatically.

In the transmission assembly 10, the first forward gear is selected by engaging the third stationary clutch 42 to connect the ring gear 48 and the planet carrier 52 to the housing 14 to provide a third under-drive mode of operation. Simultaneously, the second stationary clutch 74 of the second section 26 is engaged to connect the ring gear 88 to the stationary housing 14 to reduce speed with respect to the coupling member 28. Selecting the gear ratio associated with this first forward gear provides an overall gear ratio of approximately 8.41 in a forward direction.

A shift to second gear from first gear is accomplished by disengaging the clutch 42 and engaging the clutch 40. This results in the second under-drive mode of operation, connecting the planet carrier 46 to the housing 14. It can be noted from FIG. 3 that the clutch 74 remains engaged and the total reduction is approximately 6.71.

A shift from second to third gear is accomplished by disengaging the clutch 40 and engaging the clutch 38. This results in the first under-drive mode of operation, connecting the coupling member 36 and the sun gears 44, 50, and 56 to the housing 14. It can be noted from FIG. 2 that the clutch 74 remains engaged and the total reduction is approximately 5.36.

To shift from third gear to fourth gear, the clutch 38 is disengaged and the clutch 42 is engaged to return to the third under-drive mode. Simultaneously, the clutch 74 is disengaged and the clutch 72 is engaged to connect the ring gear 82 to the housing 14. It can be noted from FIG. 2 that the overall gear ratio is approximately 4.26.

A shift from fourth gear to fifth gear is accomplished by disengaging the clutch 42 and engaging the clutch 40. It can be noted from FIG. 2 that the clutch 72 remains engaged and the total reduction is approximately 3.40.

A shift from fifth gear to sixth gear is accomplished by disengaging the clutch 40 and engaging the clutch 38. It can be noted from FIG. 2 that the clutch 72 remains engaged and the total reduction is approximately 2.72.

To shift from sixth gear to seventh gear, the clutch 38 is disengaged and the clutch 42 is engaged. Simultaneously, the clutch 72 is disengaged and the clutch 70 is engaged to connect the intermediate coupling member 66 and the sun gears 78 and 84 to the planet carrier 80. It can be noted from FIG. 2 that the overall gear ratio is approximately 2.17.

A shift from seventh gear to eighth gear is accomplished by disengaging the clutch 42 and engaging the clutch 40. It can be noted from FIG. 2 that the clutch 70 remains engaged and the total reduction is approximately 1.73.

A shift from eighth gear to ninth gear is accomplished by disengaging the clutch 40 and engaging the clutch 38. It can be noted from FIG. 2 that the clutch 70 remains engaged and the total reduction is approximately 1.38.

Neutral is achieved by engaging the clutch 40, or any other suitable clutch.

Reverse is achieved by engaging the clutch 40 and the clutch 76 to lock the ring gear 94 to the housing 14. With the ring gear 94 held stationary, the second and the third planetary gear assemblies 64, 68 of the second section 26 cooperate to provide a negative speed reduction along multiple power paths wherein the planet carrier torques are subtracted from one another. In other words, a portion of the torque flow is recirculated from the sun gear 90 back to the ring gear 88. It can be noted from FIG. 3 that the total reduction is approximately −8.00.

Referring now to the transmission assembly 100 and in contrast to first section 24 of transmission assembly 10, the clutch 108 is engaged to connect the planet carrier 112 and ring gear 128 to ring gear 122, and to the input member 16 to provide a direct drive mode of operation. The clutch 106 is engaged to connect the ring gear 116 to the housing 14 to provide the second under-drive mode of operation. The clutch 104 is engaged to connect the coupling member 101 and the sun gears 110 and 118 to the housing 14 to provide the first mode of under-drive operation. As noted in FIG. 4, reduction ratios for $1^{st}$ through $9^{th}$ gears are approximately: 5.91, 4.73, 3.79, 3.04, 1.43, 1.94, 1.56, 1.25, and 1.00.

Neutral and reverse are engaged in the manner as the first embodiment, with a reverse reduction of approximately −4.96.

In view of the foregoing, it can be appreciated that the transmission embodiments of FIGS. 2 and 4 have particularly advantageous front sections 24, 124, serving as the input and being normally driven by a power source, and three planetary gear sets. The plurality of clutches selectively couple various components for achieving the gear ratios required to keep the power source within a desired speed range thereby providing improved efficiency.

It will be apparent to those skilled in the art that various modifications and variations can be made in the disclosed transmission assemblies without departing from the scope of the disclosure. Other embodiments of the disclosed transmission will be apparent to those skilled in the art from consideration of the specification and practice of the transmission disclosed herein. It is intended that the specification and examples be considered as exemplary only, with a true scope of the disclosure being indicated by the following claims and their equivalents.

What is claimed is:

1. A transmission assembly, comprising:
   a stationary housing;
   a first section having a coupling member, a first planetary gear assembly, a second planetary gear assembly, and a third planetary gear assembly, each of the planetary gear assemblies being disposed in the stationary housing and including a ring gear, at least one planet carrier having at least one planet gear disposed on the at least one planet carrier and a sun gear, wherein the at least one planet gear of each planetary gear assembly is adapted to mesh with at least one of the sun gear and the ring gear of the corresponding planetary gear assembly, and wherein the sun gears of at least the first and second planetary gear assemblies are operatively connected to the coupling member;
   an input member operatively connected to the third planetary gear assembly;
   a first stationary clutch adapted to selectively and operatively connect the coupling member to the stationary housing;
   a second stationary clutch adapted to selectively and operatively connect at least one of the at least one planet carrier and ring gear of the first planetary gear assembly to the stationary housing; and
   an intermediate coupling member operatively connected to the third planetary gear assembly and adapted to be driven by the first section, wherein:
   the input member is operatively connected to the ring gear of the third planetary gear assembly;
   the planet carrier of the third planetary gear assembly is operatively connected to the ring gear of the second planetary gear assembly and the intermediate coupling member;
   the planet carrier of the second planetary gear assembly is operatively connected to the ring gear of the first planetary gear assembly; and
   the sun gear of the third planetary gear assembly is operatively connected to the coupling member.

2. The transmission assembly of claim 1, wherein the second stationary clutch is adapted to selectively and operatively connect the planet carrier of the first planetary gear assembly to the stationary housing.

3. The transmission assembly of claim 2, further including a third stationary clutch adapted to selectively and operatively connect the ring gear of the first planetary gear assembly and the planet carrier of the second planetary gear assembly to the stationary housing.

4. The transmission assembly of claim 3, further including a second section having:
   a final output member rotatably disposed in the stationary housing;
   a fourth planetary gear assembly, a fifth planetary gear assembly, and a sixth planetary gear assembly operatively disposed in the stationary housing, each of the planetary gear assemblies including a ring gear, at least one planet carrier having at least one planet gear, and a sun gear, wherein the at least one planet gear is adapted to mesh with the sun gear and the ring gear of the corresponding planetary gear assembly, wherein the sun gear of the fourth planetary gear assembly is operatively connected to the intermediate coupling member of the first section, the sun gear of the fifth planetary gear assembly is operatively connected to the intermediate coupling member of the first section, the planet carrier of the fourth planetary gear assembly is operatively connected to the ring gear of the fifth planetary gear assembly, the ring gear of the fifth planetary gear assembly is operatively connected to the sun gear of the sixth planetary gear assembly, the planet carrier of the fifth planetary gear assembly is operatively connected to the final output member, and the planet carrier of the sixth planetary gear assembly is operatively connected to the final output member;
   a rotating clutch adapted to selectively and operatively connect the planet carrier of the fourth planetary gear assembly to the intermediate coupling member of the first section;
   a fourth stationary clutch adapted to selectively and operatively connect the ring gear of the fourth planetary gear assembly to the stationary housing;
   a fifth stationary clutch adapted to selectively and operatively connect the ring gear of the fifth planetary gear assembly to the housing; and
   a sixth stationary clutch adapted to selectively and operatively connect the ring gear of the sixth planetary gear assembly to the stationary housing.

5. The transmission assembly of claim 4, wherein:
   a first forward gear ratio is selected by engaging the third and fifth stationary clutches;
   a second forward gear ratio is selected by engaging the second and fifth stationary clutches;
   a third forward gear ratio is selected by engaging the first and fifth stationary clutches;
   a fourth forward gear ratio is selected by engaging the third and fourth stationary clutches;
   a fifth forward gear ratio is selected by engaging the second and fourth stationary clutches;
   a sixth forward gear ratio is selected by engaging the first and fourth stationary clutches;
   a seventh forward gear ratio is selected by engaging the third stationary clutch and the rotating clutch;
   an eighth forward gear ratio is selected by engaging the second stationary clutch and the rotating clutch;
   a ninth forward gear ratio is selected by engaging the first stationary clutch and the rotating clutch; and
   a reverse gear ratio is selected by engaging the second stationary and sixth stationary clutches.

6. A transmission assembly, comprising:
a stationary housing;
a first section having a coupling member, a first planetary gear assembly, a second planetary gear assembly, and a third planetary gear assembly, each of the planetary gear assemblies being disposed in the stationary housing and including a ring gear, at least one planet carrier having at least one planet gear disposed on the at least one planet carrier and a sun gear, wherein the at least one planet gear of each planetary gear assembly is adapted to mesh with at least one of the sun gear and the ring gear of the corresponding planetary gear assembly, and wherein the sun gears of at least the first and second planetary gear assemblies are operatively connected to the coupling member;
an input member operatively connected to the third planetary gear assembly;
a first stationary clutch adapted to selectively and operatively connect the coupling member to the stationary housing;
a second stationary clutch adapted to selectively and operatively connect at least one of the at least one planet carrier and ring gear of the first planetary gear assembly to the stationary housing;
an intermediate coupling member operatively connected to the third planetary gear assembly and adapted to be driven by the first section; wherein
the sun gear of the third planetary gear assembly is operatively connected to the input member;
the ring gear of the third planetary gear assembly is operatively connected to the planet carriers of the first and second planetary gear assemblies;
the intermediate coupling member is operatively connected to the planet carrier of the third planetary gear assembly;
wherein the second stationary clutch is adapted to selectively and operatively connect the ring gear of the first planetary gear assembly to the stationary housing; and
first rotating clutch adapted to selectively and operatively connect the planet carriers of the first and second planetary gear assemblies and the ring gear of the third planetary gear assembly to the ring gear of the second planetary gear assembly and the input member.

7. The transmission assembly of claim 6, wherein the planet carrier of the first planetary gear assembly includes two sets of planet gears, an inner set meshing with the sun gear and an outer set meshing with both the inner set and the ring gear.

8. The transmission assembly of claim 7, further including a second section having:
an output member rotatably disposed in the stationary housing;
a fourth planetary gear assembly, a fifth planetary gear assembly, and a sixth planetary gear assembly operatively disposed in the stationary housing, each of the planetary gear assemblies including a ring gear, at least one planet carrier having at least one planet gear, and a sun gear, wherein the at least one planet gear is adapted to mesh with the sun gear and the ring gear of the corresponding planetary gear assembly, wherein the sun gear of the fourth planetary gear assembly is operatively connected to the intermediate coupling member of the first section, the sun gear of the fifth planetary gear assembly is operatively connected to the intermediate coupling member of the first section, the planet carrier of the fourth planetary gear assembly is operatively connected to the ring gear of the fifth planetary gear assembly, the ring gear of the fifth planetary gear assembly is operatively connected to the sun gear of the sixth planetary gear assembly, the planet carrier of the fifth planetary gear assembly is operatively connected to the output member, and the planet carrier of the sixth planetary gear assembly is operatively connected to the output member;
a second rotating clutch adapted to selectively and operatively connect the planet carrier of the fourth planetary gear assembly to the intermediate coupling member of the first section;
a third stationary clutch adapted to selectively and operatively connect the ring gear of the fourth planetary gear assembly to the stationary housing;
a fourth stationary clutch adapted to selectively and operatively connect the ring gear of the fifth planetary gear assembly to the housing; and
a fifth stationary clutch adapted to selectively and operatively connect the ring gear of the sixth planetary gear assembly to the stationary housing.

9. The transmission assembly of claim 8, wherein:
a first forward gear ratio is selected by engaging the second and fourth stationary clutches;
a second forward gear ratio is selected by engaging the first and fourth stationary clutches;
a third forward gear ratio is selected by engaging the first rotating and fourth stationary clutches;
a fourth forward gear ratio is selected by engaging the second and third stationary clutches;
a fifth forward gear ratio is selected by engaging the first and third stationary clutches;
a sixth forward gear ratio is selected by engaging the first rotating and third stationary clutches;
a seventh forward gear ratio is selected by engaging the second stationary and second rotating clutches;
an eighth forward gear ratio is selected by engaging the first stationary and second rotating clutches;
a ninth forward gear ratio is selected by engaging the first and second rotating clutches; and
a reverse gear ratio is selected by engaging the first rotating and fifth stationary clutches.

10. A work machine, comprising:
a power source;
a traction device;
a transmission assembly operatively connected to the power source and the traction device and adapted to translate the rotational speed of the power source into a desired rotational speed of the traction device, wherein the transmission assembly includes:
a stationary housing;
a first section having a coupling member, a first planetary gear assembly, a second planetary gear assembly, and a third planetary gear assembly, each of the planetary gear assemblies being disposed in the stationary housing and including a ring gear, at least one planet gear disposed on a planet carrier and a sun gear, wherein the at least one planet gear of each planetary gear assembly is adapted to mesh with at least one of the sun gear and the ring gear of the corresponding planetary gear assembly, and wherein the sun gears of at least the first and second planetary gear assemblies are operatively connected to the coupling member;
an input member operatively connected to the third planetary gear assembly;

a first stationary clutch adapted to selectively and operatively connect the coupling member to the housing;

a second stationary clutch adapted to selectively and operatively connect at least one of the planet carrier and ring gear of the first planetary gear assembly to the stationary housing; and an intermediate coupling member operatively connected to the third planetary gear assembly and adapted to be driven by the first section, wherein:

the input member is connected to the ring gear of the third planetary gear assembly;

the planet carrier of the third planetary gear assembly is operatively connected to the ring gear of the second planetary gear assembly and the intermediate coupling member;

the planet carrier of the second planetary gear assembly is operatively connected to the ring gear of the first planetary gear assembly; and the sun gears of the first, second, and third planetary gear assemblies are operatively connected to the coupling member.

11. The work machine of claim 10, wherein the second stationary clutch is adapted to selectively and operatively connect the planet carrier of the first planetary gear assembly to the stationary housing.

12. The work machine of claim 11, further including a third stationary clutch adapted to selectively and operatively connect the ring gear of the first planetary gear assembly and the planet carrier of the second planetary gear assembly to the stationary housing.

13. A work machine, comprising:
a power source;
a traction device;
a transmission assembly operatively connected to the power source and the traction device and adapted to translate the rotational speed of the power source into a desired rotational speed of the traction device, wherein the transmission assembly includes:
a stationary housing;
a first section having a coupling member, a first planetary gear assembly, a second planetary gear assembly, and a third planetary gear assembly, each of the planetary gear assemblies being disposed in the stationary housing and including a ring gear, at least one planet gear disposed on a planet carrier and a sun gear, wherein the at least one planet gear of each planetary gear assembly is adapted to mesh with at least one of the sun gear and the ring gear of the corresponding planetary gear assembly, and wherein the sun gears of at least the first and second planetary gear assemblies are operatively connected to the coupling member;
an input member operatively connected to the third planetary gear assembly;
a first stationary clutch adapted to selectively and operatively connect the coupling member to the housing;
a second stationary clutch adapted to selectively and operatively connect at least one of the planet carrier and ring gear of the first planetary gear assembly to the stationary housing; and
an intermediate coupling member operatively connected to the third planetary gear assembly and adapted to be driven by the first section, wherein:
the sun gear of the third planetary gear assembly is operatively connected to the ring gear of the second planetary gear assembly and the input member;
the ring gear of the third planetary gear assembly is operatively connected to the planet carriers of the first and second planetary gear assemblies; and
the intermediate coupling member is operatively connected to the planet carrier of the third planetary gear assembly.

14. The work machine of claim 13, wherein the second stationary clutch is adapted to selectively and operatively connect the ring gear of the first planetary gear assembly to the stationary housing.

15. The work machine of claim 14, further including a first rotating clutch adapted to selectively and operatively connect the planet carriers of the first and second planetary gear assemblies and the ring gear of the third planetary gear assembly to the ring gear of the second planetary gear assembly, and the input member.

16. The work machine of claim 15, wherein the planet carrier of the first planetary gear assembly includes two sets of planet gears, an inner set meshing with the sun gear and an outer set meshing with both the inner set and the ring gear.

17. A work machine, comprising:
a power source;
a traction device;
a transmission assembly operatively connected to the power source and the traction device and adapted to translate the rotational speed of the power source into a desired rotational speed of the traction device, wherein the transmission assembly includes:
a stationary housing;
a first section having a coupling member, a first planetary gear assembly, a second planetary gear assembly, and a third planetary gear assembly, each of the planetary gear assemblies being disposed in the stationary housing and including a ring gear, at least one planet gear disposed on a planet carrier and a sun gear, wherein the at least one planet gear of each planetary gear assembly is adapted to mesh with at least one of the sun gear and the ring gear of the corresponding planetary gear assembly, and wherein the sun gears of at least the first and second planetary gear assemblies are operatively connected to the coupling member;
an input member operatively connected to the third planetary gear assembly;
a first stationary clutch adapted to selectively and operatively connect the coupling member to the housing;
a second stationary clutch adapted to selectively and operatively connect at least one of the planet carrier and ring gear of the first planetary gear assembly to the stationary housing;
an intermediate coupling member operatively connected to the third planetary gear assembly and adapted to be driven by the first section;
a second section having:
a final output member rotatably disposed in the stationary housing;
a fourth planetary gear assembly, a fifth planetary gear assembly, and a sixth planetary gear assembly operatively disposed in the stationary housing, each of the planetary gear assemblies including a ring gear, at least one planet gear disposed on a planet carrier, and a sun gear, wherein the at least one planet gear assembly is adapted to mesh with the sun gear and the ring gear of the corresponding planetary gear assembly, wherein the sun gear of the fourth planetary gear assembly is operatively connected to the intermediate coupling member of the first section, the sun gear of the fifth planetary gear assembly is operatively connected to the intermediate coupling member of the first section, the planet carrier of the fourth planetary gear assembly is operatively connected to the ring gear of the fifth planetary gear assembly, the ring gear of the fifth planetary gear assembly is operatively connected to the sun gear of the sixth planetary gear assembly, the planet carrier of the fifth planetary gear assembly is operatively connected to the final output member, and the planet carrier of the sixth planetary gear assembly is operatively connected to the final output member;

a rotating clutch adapted to selectively and operatively connect the planet carrier of the fourth planetary gear assembly to the intermediate coupling member of the first section;

a first stationary clutch adapted to selectively and operatively connect the ring gear of the fourth planetary gear assembly to the stationary housing;

a second stationary clutch adapted to selectively and operatively connect the ring gear of the fifth planetary gear assembly to the stationary housing; and a third stationary clutch adapted to selectively and operatively connect the ring gear of the sixth planetary gear assembly to the stationary housing.

* * * * *